Aug. 23, 1932.  H. HOUSE  1,872,737
ILLUMINATED CHART READING DEVICE
Filed Feb. 20, 1931   2 Sheets-Sheet 1

INVENTOR

ATTORNEY

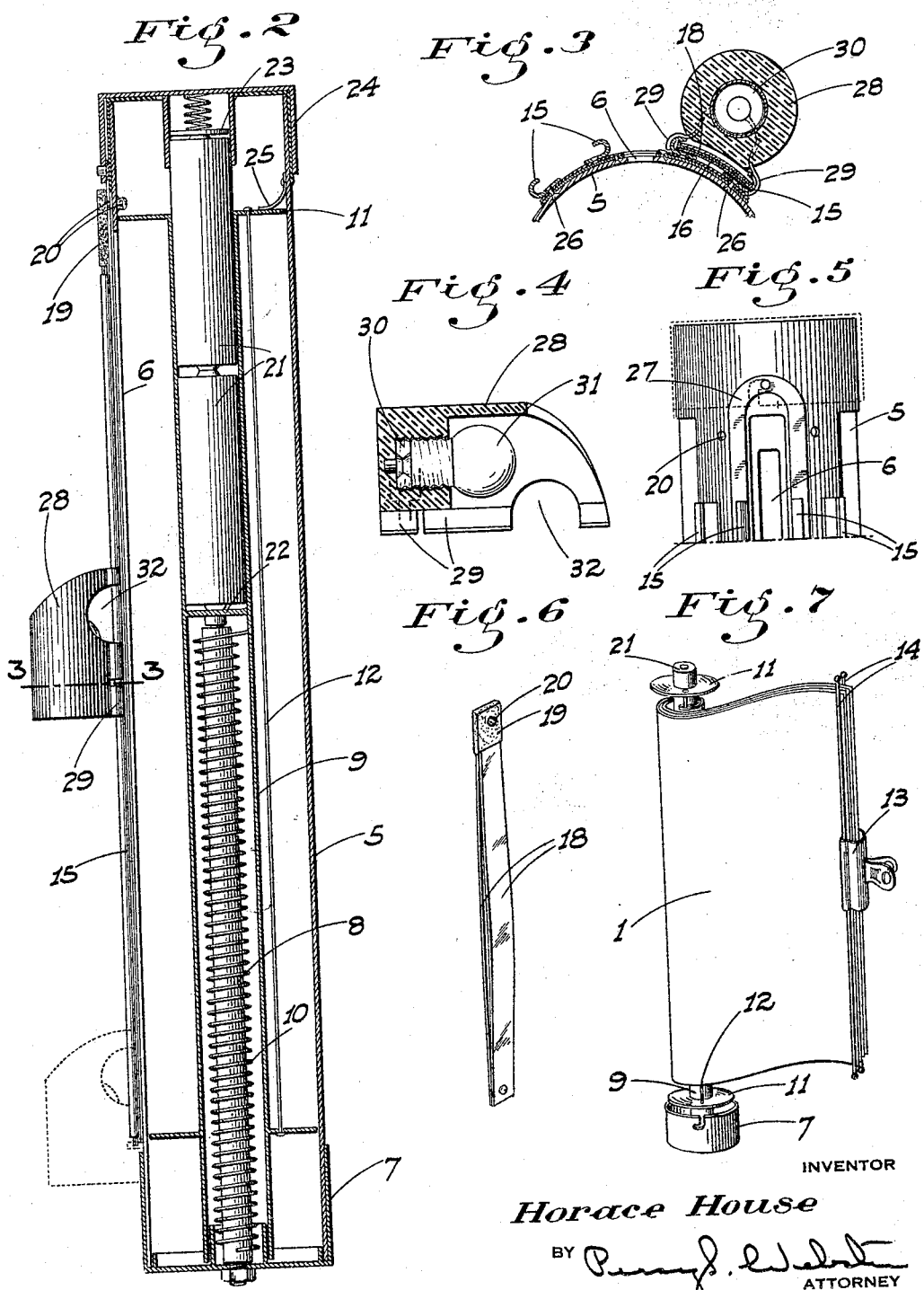

Patented Aug. 23, 1932

1,872,737

UNITED STATES PATENT OFFICE

HORACE HOUSE, OF OROVILLE, CALIFORNIA

ILLUMINATED CHART READING DEVICE

Application filed February 20, 1931. Serial No. 517,247.

This invention relates to a device to aid in reading data from tabulated charts and other sheets, and especially to devices for the use of trainmen in reading time-tables at night.

The enginemen of trains are required to carry a time-table of the various trains of the particular section of the division over which they are running. It is necessary for them to compare the position or their train by means of the time-table with the position of other trains in the same section in order to avoid the possibility of the trains meeting between sidings. This procedure is, of course, especially necessary on a single track line. Due to the fact that the only illumination in the engine cab at night is that provided by the feeble gauge lights and the glare from the fire-door, the reading of the closely spaced and small figures on the time-table, with the aid of such light is a difficult matter. This difficulty is enhanced by the rocking and swaying movement of the engine, and to the fact that the rows of tabulated figures which have to be compared, are frequently spaced a considerable distance apart from each other on the time-table. The time-table is usually folded to a size to fit into the pocket, and in a short time the creases of the folds become worn considerably, thus eradicating the schedule numbers or rendering the same illegible. Also, no means is provided for checking across the time-table sheet from the station times of the trains concerned, and deductions or readings made under these conditions are therefore apt to be inaccurate and in many cases difficult to make.

The principal object of my invention is to avoid the present uncertain and inconvenient method by providing a device to hold the time-table and by means of which the time data relative to any train on the sub-division may be brought into close proximity with the base data from which the comparisons are made; and arranged with a device to definitely illuminate any desired set of such figures. It is not necessary to fold a time-table to thus align the rows and the user does not have to depend upon the uncertain light of the cab in reading the figures. The illuminating means is directly associated with the sheet holder and the user may easily read the necessary data regardless of the swaying or jolting of the engine. The device is also made up as a portable unit which may be carried in the hand or the pocket from one point to another, if desired, and without the time-table being folded.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is a longitudinal section of the device taken on the line 2—2 of Fig. 1.

Fig. 3 is an enlarged fragmentary cross-section on the line 3—3 of Fig. 2.

Fig. 4 is a longitudinal section of the sliding lamp housing detached.

Fig. 5 is a fragmentary plan view of the time-table housing cylinder, taken at one end.

Fig. 6 is a perspective view of the data-strip holding slide detached.

Fig. 7 is a perspective view of the time-table and battery holding spool, detached from the housing and shown in connection with the time-table.

Figure 1:
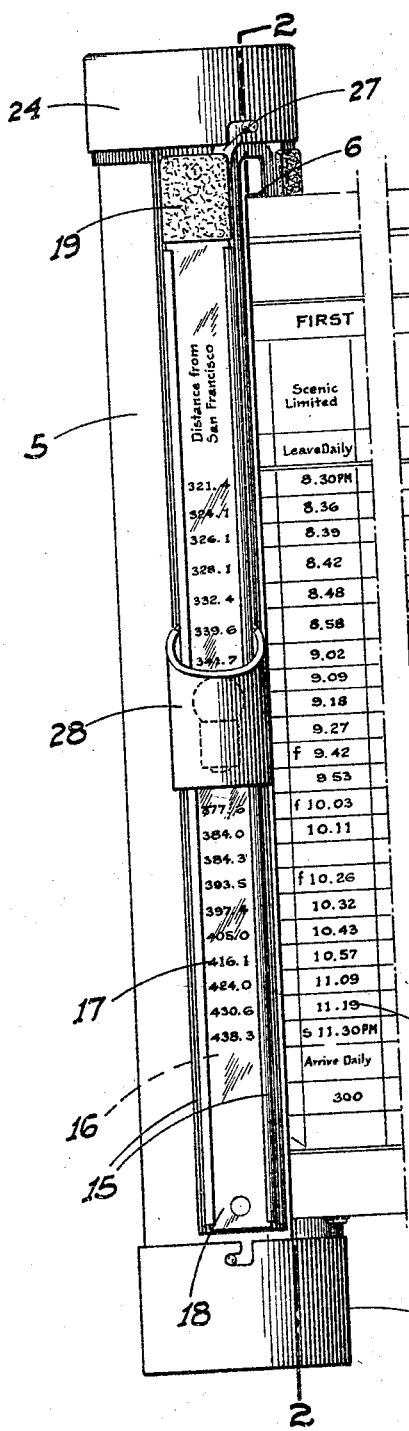
Fig. 1 is a top plan view of my improved apparatus shown as in operation.
Figure 1:

Referring now more particularly to the characters of reference on the drawings, the time-table 1, with which the holding and illuminating device is particularly designed to be used, is of the standard type supplied trainmen by the different roads. It consists of a number of flexible sheets connected together at their center of length so as to form a booklet having a certain number of pages. One page is allotted to each section of a division of the road and carries a number of vertical rows of figures 2, one for each train operating over said section. These figures give the times of the respective trains with relation to, and are horizontally aligned with the station names 3 on the sheet. To the sides of the station names are rows 4 of oppositely reading "mileage distances", from a given point. The list of station names and the accompanying figures 4 are printed only once on the sheet, whereas there are usually a considerable number of the rows 2. As a result certain ones of certain rows 2 are some distance from the station and the mileage figure data, and it is hard on the swaying engine to accurately line up such data from these widely separated rows.

It is to remedy this objectionable feature, as well as to provide for a better illumination of the time-table at night, that my improved holding and illuminating device is provided.

The device comprises a cylindrical tubular barrel 5, open on both ends and provided with a longitudinal slot 6 extending from one end to a point short of the opposite end and having a length greater than the height of a time-table. Removably locked against rotation and on the end of the barrel to which the slot is open, is a cap 7. Rigidly fixed in connection with this cap is a stem 8, adapted to project into the barrel centrally thereof and considerably smaller and shorter.

Mounted in connection with and about the stem and extending from the cap nearly to the opposite end of the barrel is a tubular spool 9, which is also of considerably smaller diameter than the barrel. A spring 10 between the stem and the spool tends to rotate the latter in one direction relative to the stem. Fixed on the spool in longitudinally spaced relation is a pair of circular flanges having a running fit in the barrel and the space therebetween being but slightly greater than the height of the time-table.

A wire 12, or the like, is connected to and extends between the flanges adjacent and parallel to the spool; this wire serving as a means for attaching the time-table to the spool in the self-evident manner shown in Fig. 7, so that the time-table may be wrapped about the spool without slipping. In mounting the spool and the time-table in connection with the barrel, said time-table is initially wound on the spool and the latter is then inserted in the barrel while the outer end of the time-table is engaged with the slot 6. The cap 7 is then locked against rotation and upon drawing the time-table out so that it is unwound from the spool, the spring 8 will be placed in tension. A pressure will, therefore, always be acting on the time-table to maintain the same wound on the spool and concealed within the barrel.

To prevent the outer end of the time-table from slipping through the slot 6, I apply a spring slip 13 thereto, having opposed jaws or gripping elements 14 extending the full height of the time-table and engaging the same, and which may be used as a means to pull the time-table out.

Mounted on the barrel on both sides of the slot 6 are strip-supporting devices, each comprising a pair of opposed grooved rails 15, extending practically the full length of the barrel between the end caps. Each face of each strip 16 has a vertically disposed row of figures 17 thereon, which are the same as and correspond in position to the figures 4 on the opposite sides of the station listing column 3 of the time-table. This strip is disposed between a pair of window strips 18, of a width to slidably engage the rail grooves. The strips 18 are connected together only at their ends, and at one end are also connected to a flexible tab 19 adapted to project beyond the corresponding ends of the rails, whereby the strip unit may be readily slid into or out of place.

The tab and barrel are provided with co operating catch means, such as the well-known snap fasteners used on gloves and other articles, and as indicated at 20.

By means of this arrangement it will be seen that any rows of the figures 2 on the time-table may be placed immediately adjacent to the row of the figures 17, so that the necessary comparison and computation may be easily made without folding the time-table or tracing across from such row 2 to the centrally disposed row 4 on the time-table. If one side of a page of the time-table is being used, it co-operates with a strip 16 on the corresponding side of the slot 6. If the opposite side of the page is being used, the strip 16, which is on the opposite side of the slot 6, is then used in conjunction therewith. The time-table is of course initially engaged with the spool so that the desired page (only one of which is ever used at a time) is the outer-most one of the time-table.

To illuminate the corresponding sets of figures of the two rows 2 and 17 at night, I employ the following structure:

Removably mounted in the spool at the end opposite the cap 7 are dry cells 21, such as are used in pocket flash lights. The bottom terminal of the inner-most cell has electrical connection with the spool (which is metal) by a cross-member 22, which supports the cell. The opposite terminal of the outer-most cell engages a spring-pressed disk 23, mounted in a metal cap 24, which is removably locked on and insulated from the adjacent end of the barrel, which is also metal. Positive electrical connection is made from the spool to the barrel by a spring contact 25 mounted in the barrel and engaging one of the flanges 11. The rails of the two guide units are insulated from each other, one rail only of each unit being electrically connected to the barrel as by the holding rivets 26, indicated in Fig. 3. The other rails are insulated throughout from the barrel and are provided at one end with an interconnecting extension 27, which is insulated from the barrel but engaged by the cap 24 when the latter is in place.

Slidably mounted on one or the other of the co-operating pairs of rails and movable from one end of the same is a substantially cylindrical opaque housing 28 of insulated material, which is open at the front end and along the bottom and closed at the rear end. Rail engaging elements 29 insulated from each other are mounted in connection with the housing for sliding engagement with the rails. The rear end portions of the elements 29 are separated from the forward portions and are electrically connected to the terminals of a socket 30, mounted in the closed end of the housing and engaged by the base of a lamp or bulb 31. The housing also has side openings 32 adjacent the bottom and toward the front end so that the rays from the lamp may shine laterally.

By means of the above described arrangement, it will be seen that when all the parts of the structure are in place a circuit will be closed through the lamp, causing short portions of the adjacent rows of figures 2 and 17 to be simultaneously illuminated. Since the lamp housing is slidable along the rail, any desired set of figures may be easily brought within the range of illumination without disturbing the time-table or shifting the strip 16. If the lamp housing is slid down on the rails to a point sufficient to cause the socket connected portions of the elements 29 to clear the rails, as indicated in dotted lines in Fig. 2, the circuit to the lamp will be broken. This avoids the necessity of mounting a switch in connection with the structure while of course saving battery current. Since only one of the strips 16 is ever used during any one run, only one lamp and its housing is necessary. This housing being removably associated with its supporting rails, it may be switched from one set of rails to the other in but a few seconds time when necessary.

Although I have particularly described this device as being used in connection with a time-table, it is to be understood that it may also prove of value in connection with charts and tabulated sheets of various kind, but of a different nature from a time-table.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A chart holding device comprising a barrel having a longitudinal slot, a spool turnably mounted in the barrel and on which the chart is wound with the unwound portion projecting through the slot, a dry cell mounted in the spool and having opposed terminals, said cell projecting from one end of the spool and having one terminal on said end, a cap removably mounted on and insulated from the barrel and engaging said one terminal, means electrically connecting the barrel and the other terminal, rails insulated from each other and mounted on the barrel lengthwise of and adjacent the slot, one rail having electrical connection with the barrel and the other with the cap, a lamp, an insulation member in which the lamp is supported, separated elements mounted on the housing and engaging the rails, and separate electrical connections between said elements and the terminals of the lamp.

2. A chart holding device comprising a barrel having a longitudinal slot, a spool turnably mounted in the barrel and on which the chart is wound with the unwound portion projecting through the slot, a lamp, guide rails on the barrel on opposite sides of and parallel to the slot, said rails being insulated from each other, elements slidably engaging the rails and separately connected to the lamp terminals, a source of current mounted on the device, and a circuit in which said source and rails are interposed.

3. A chart holding device comprising a barrel having a longitudinal slot, a spool turnably mounted in the barrel and on which the chart is wound with the unwound portion projecting through the slot, a lamp, guide rails on the barrel on opposite sides of and parallel to the slot, said rails being insulated from each other, elements slidably engaging the rails and separately connected to the lamp terminals, a battery having separate terminals mounted on the device and separate electrical connections between said terminals and the rails.

In testimony whereof I affix my signature.

HORACE HOUSE.